United States Patent [19]
Marshall et al.

[11] Patent Number: 5,933,132
[45] Date of Patent: Aug. 3, 1999

[54] METHOD AND APPARATUS FOR CALIBRATING GEOMETRICALLY AN OPTICAL COMPUTER INPUT SYSTEM

[75] Inventors: Roger N. Marshall, Solana Beach; Lane T. Hauck, San Diego, both of Calif.

[73] Assignee: Proxima Corporation, San Diego, Calif.

[21] Appl. No.: 08/648,659

[22] Filed: May 15, 1996

Related U.S. Application Data

[63] Continuation of application No. 08/342,905, Nov. 21, 1994, abandoned, which is a continuation of application No. 08/115,522, Aug. 31, 1993, abandoned, which is a continuation of application No. 07/656,803, Feb. 14, 1991, abandoned, which is a continuation-in-part of application No. 07/433,029, Nov. 7, 1989, abandoned, and a continuation-in-part of application No. 07/611,416, Nov. 9, 1990, Pat. No. 5,181,015.

[51] Int. Cl.$^6$ ............................................. G09G 5/08
[52] U.S. Cl. ............................................. 345/158; 345/7
[58] Field of Search .................................. 345/7, 8, 158, 345/180, 182, 183, 157; 348/187, 189, 190, 744, 745, 746, 747, 806; 395/141, 441; 382/293, 294

[56] References Cited

U.S. PATENT DOCUMENTS

| | | | |
|---|---|---|---|
| 4,857,998 | 8/1989 | Tsujihara et al. | 348/747 |
| 5,070,465 | 12/1991 | Kato | 395/141 |
| 5,091,773 | 2/1992 | Fouche et al. | 348/806 |

*Primary Examiner*—Xiao Wu
*Attorney, Agent, or Firm*—Higgs, Fletcher & Mack LLP; Bernard L. Kleinke; William J. Kolegraff

[57] ABSTRACT

A method and apparatus geometrically makes correction in an optical computer input system.

18 Claims, 10 Drawing Sheets

METHOD AND APPARATUS FOR CALIBRATING GEOMETRICALLY AN OPTICAL COMPUTER INPUT SYSTEM

CROSS-REFERENCES TO RELATED APPLICATIONS

This application is a continuation patent application of U.S. patent application Ser. No. 08/342,905, filed Nov. 21, 1994, now abandoned, entitled "METHOD AND APPARATUS FOR CALIBRATING GEOMETRICALLY AN OPTICAL COMPUTER INPUT SYSTEM," which is a continuation patent application of U.S. patent application Ser. No. 08/115,522, filed Aug. 31, 1993, now abandoned, entitled "METHOD AND APPARATUS FOR CALIBRATING GEOMETRICALLY AN OPTICAL COMPUTER INPUT SYSTEM," which is a continuation patent application of U.S. patent application Ser. No. 07/656,803, filed Feb. 14, 1991, now abandoned, entitled "METHOD AND APPARATUS FOR CALIBRATING GEOMETRICALLY AN OPTICAL COMPUTER INPUT SYSTEM," which is a continuation-in-part patent application of U.S. patent application Ser. No. 07/433,029, filed Nov. 7, 1989, now abandoned, entitled "COMPUTER INPUT SYSTEMS AND METHOD OF USING SAME", and of U.S. patent application Ser. No. 07/611,416, filed Nov. 9, 1990, now U.S. Pat. No. 5,181,015, entitled "METHOD AND APPARATUS FOR CALIBRATING AN OPTICAL COMPUTER INPUT SYSTEM", each one of said applications being incorporated herein by reference as fully set forth herein.

TECHNICAL FIELD

The present invention relates in general to a method in apparatus for calculating geometrically an optical computer input system. It more particularly relates to a system for calibrating geometrically for distortion in connection with such an optical computer input system is shown and described in the said patent application.

BACKGROUND

A new optical computer input system is shown and described in said parent patent application. Such system enable the use to shine a high intensity light onto a screen bearing a computer generated image to provide auxiliary information for the computer. Such an input system includes an optical sensing device, such as a charged coupled device camera focused on to the screen. Thus the system can detect high intensity light images and discriminate them from the computer generated images, to input information interactively into the computer, in a convenient manner, even in very low ambient light conditions.

While such a computer input system and method of using it has proven to be highly satisfactory, it would be desirable to provide for a geometric compensation or correction. There are various reasons why such a geometric correction is required. First, the screen onto which is projected the computer generated image may not be a perfect rectangle as presented to the sensing device or camera. In this regard, the screen may be tilted either forward or backward, or from side to side, or any combination thereof. Thus, the sensing device or camera will not track properly relative to the image visualized from the screen.

An even more significant problem is the problem of "keystoning" which is caused by an overhead projector utilized in projecting the computer generated image onto the screen. In this regard, the commonly known keystoning problem produces an image which has a longer top edge as compared to its bottom edge. Such keystoning problem is well known with overhead projectors, and thus, the sensing device or camera will produce a distortion in sensing the image projected into the computer.

A third problem is caused by the improper alignment of a projection panel on the stage of the overhead projector. In this regard, if the panel is not accurately aligned in a parallel manner on all sides relative to the projector's stage, the resulting image projected onto the screen will also be askew.

A fourth problem relates to the project itself not being properly aligned relative to the screen. Such is commonly the case where the neck portion of the overhead projector may be bent slightly due to excessive use or wear. This causes a result similar to the improper registration of the panel on the stage of the projector.

A still further problem of geometric alignment is caused by the camera or sensing device being tilted at an angle being tilted upwardly, or downwardly, relative to the plane of the screen. The result is that a distortion may occur.

As a result of both described distortions due to the geometry of the screen, projector and panel, as well as the camera itself, the camera is unable to accurately plot the various coordinates visualized from the image projected on to the screen. As a result, tracking is not able to be perfectly accomplished. Thus, when a light is projected onto the screen, the camera may not accurately know the precise coordinates of the spot of light projected onto the screen. As a result, the computer may not accurately respond to the position of the light and incorrect data can be entered. Thus, erroneous results might occur.

DISCLOSURE OF INVENTION

Therefore, the principle object of the present invention is to provide a new and improved geometric correction arrangement for an optical imaging system.

Briefly, the above referenced object is realized by providing a new and improved geometric correction system.

There is provided in accordance with the present invention, a geometric system which includes an arrangement for generating geometrically compensated relative coordinates for a projected image and for storing such coordinates.

Therefore, the system of the present invention produces a normalization of the image of the screen to provide for the necessary correction. Thus, the resulting coordinates stored by the system are continuously used to adjust or convert the coordinates sensed by the camera. Thus, suitable corrections for the distorted are produced.

BRIEF DESCRIPTION OF DRAWINGS

The above mentioned and other objects and features of this invention, and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
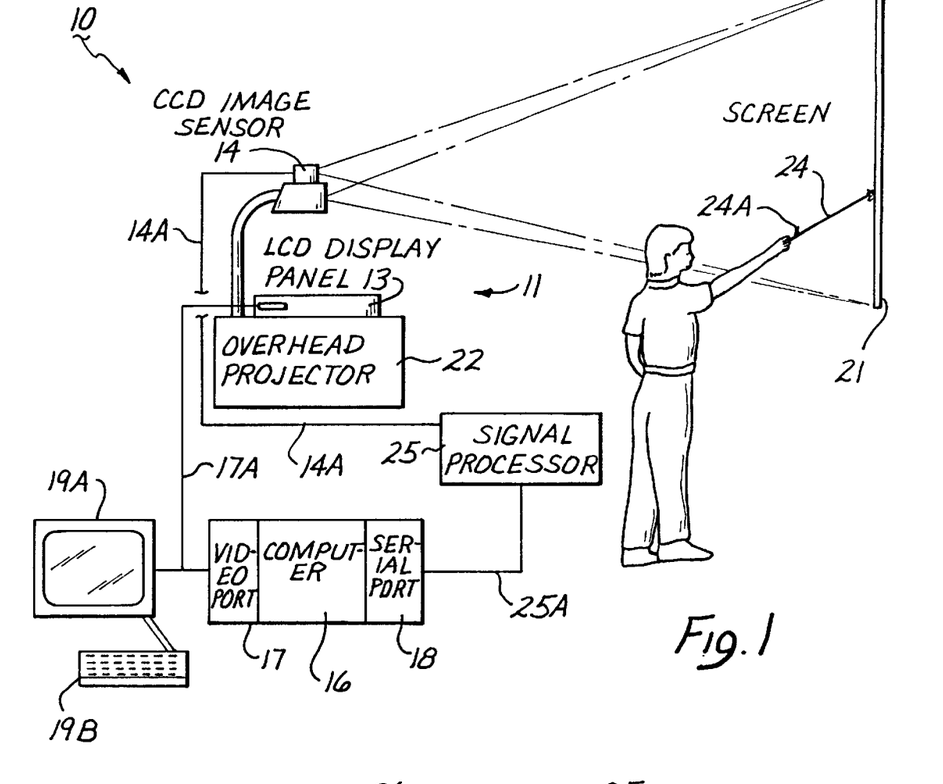
FIG. 1 is a block diagram of the imaging system.

Referring now to the drawings and more particularly FIG. 1 thereof, there is illustrated a computer input system 10 which modifies computer generated images appearing on a screen 21, and which is constructed in accordance with the present invention. The computer input system 10 generally includes an image projection/detection system or arrangement 11 whose input path (cable 17A) is coupled to the output of a video port 17 of a computer 16. The arrangement 11 comprises a liquid crystal panel 13 and a charge coupled device image sensor 14. The computer 16 is a conventional personal computer, such as a model PS/2 personal computer manufactured by International Business Machines. The computer 16 includes a video monitor 19A and keyboard 19B. The panel 13 is driven by the computer 16 for generating live images which are projected by an overhead head projector 22 onto the screen 21.

The computer input system 10 also includes a signal processing unit 25 coupled between the output path (cable 14A) of the image/detection arrangement 11 and the input serial port 18 of the computer 16 via cable 25A. The computer input system 10 further includes a light wand or light generating pointing device 24, or a laser light generating device.

The projection/detection arrangement 11 detects the presence of auxiliary light image or spot projected onto the viewing surface 21 by the handheld/battery-operated light generating device 24, and generates an analog electrical signal which is coupled to the signal processing unit 25 via cable 14A. The signal processing unit 25 responds to the analog signal, and converts the signal into digital pixel coordinates reference signals which identify the relative position of the auxiliary light image on screen 21, which are transferred into the computer 16 via the output cable 25A. Cable 25A is connected to the serial input port 18 of the computer 16. Computer 16 responds to the pixel coordinates signals and can alter its application program which causes the computer generated image being projected onto the screen 21 to be modified. For example, the computer generated projected image on the viewing area 21 can be modified in accordance with the information contained in the coordinate references signals.

Figure 2:
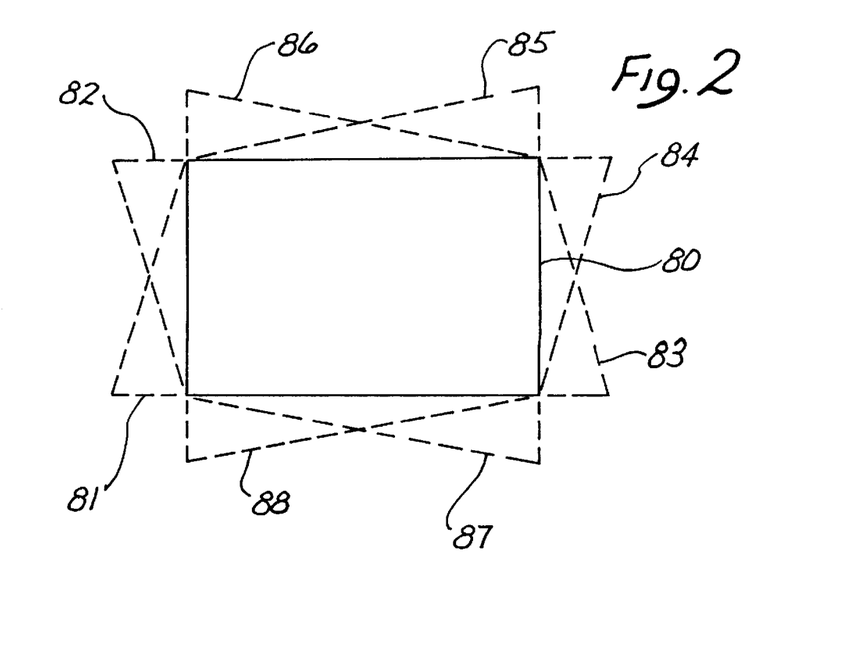
FIGS. 2 through 11 are diagrammatic views of various images or portions of images helpful in understanding the operation of the present invention.

In the firmware stored in the signal processor 25 provides the necessary geometric correction for the image in accordance with the present invention. As shown in FIG. 2, the correction commences by projecting a bright rectangular light onto the screen to determine what correction is necessary and then record the necessary information for converting the coordinates to an adjusted relative coordinate. As shown on FIG. 2, a true rectangular image is indicated at 80. It should be noted that each one of the four sides of the image can be distorted in a generally rectangular manner. On each side of the rectangular image 80 there are two possible triangular area of distortion possible. The arrangement of the present invention determines which one of the two triangular areas of distortion are present for each side of the rectangular image. Once that determination is made, a formula for the relative correction is generated and stored in the signal processor. Thus, there are eight possible triangular areas of distortion indicated at 81 through 88.

Figure 3:
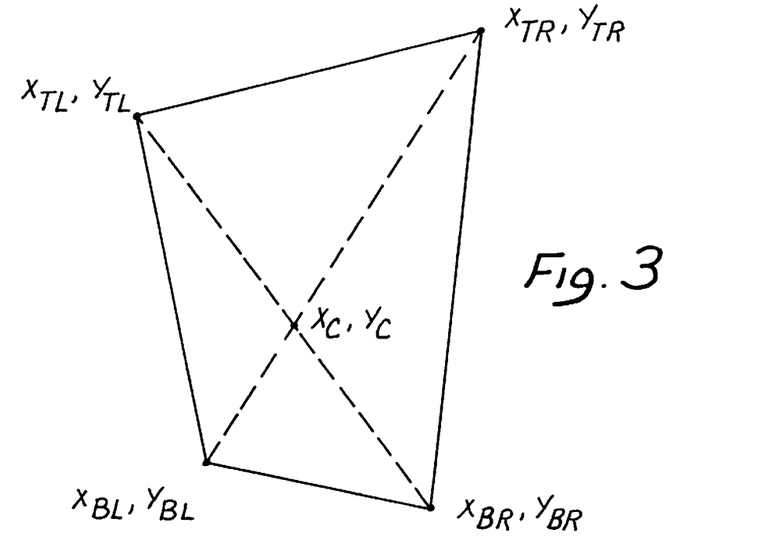

In FIG. 3, there is shown an example of a grossly distorted rectangular image 90 as an example. The first portion of the process or technique for doing the correction, is the actual corners of the projected image are shown. The coordinates for the individual corners are shown in FIG. 3. The technique for determining the corners are similar as shown and described in the parent applications.

Once the corner coordinates are generated, a defined central coordinate of X , Y is located at the intersection of the diagonals of the corners as indicated in FIG. 3. Thus, it is important to know for the purposes of the invention four quadrants of the generally rectangular image.

In this regard, if the coordinate identified on the screen is, for example, in the upper left quadrant, then one of the two top triangles must be identified, together with one of the two left triangles. In so doing, the relative coordinates for the identified spot of light on the screen can be determined accordingly.

Figure 12:
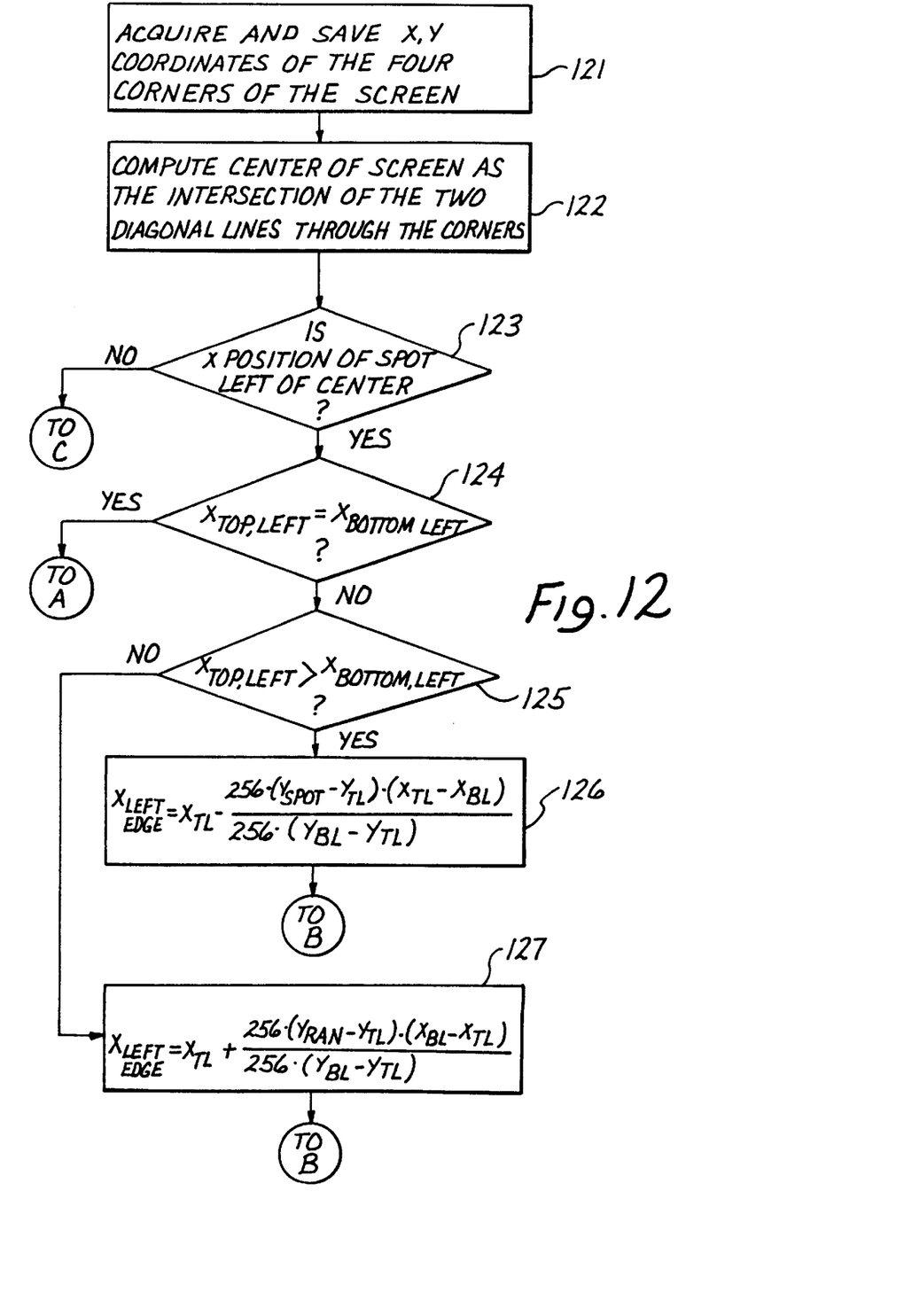
FIGS. 12 through 17 are flow charts of computer software for the system of FIG. 1 to illustrate the operation of the geometric correction arrangement.

Referring now to FIGS. 12 through 17, the software for the geometrically correct arrangement will now be considered in greater detail Once a rectangular image is projected onto the screen, such as the screen 21 of FIG. 1, the software in the signal processor 25 determines the coordinates of the four corners of the image appearing on the screen, as indicated at box 121 of FIG. 12. In this regard, the image sensor 14 (FIG. 1) determines the interface between the bright image and the remaining portion of the screen, in a similar manner as described in the parent patent applications.

Figure 13:
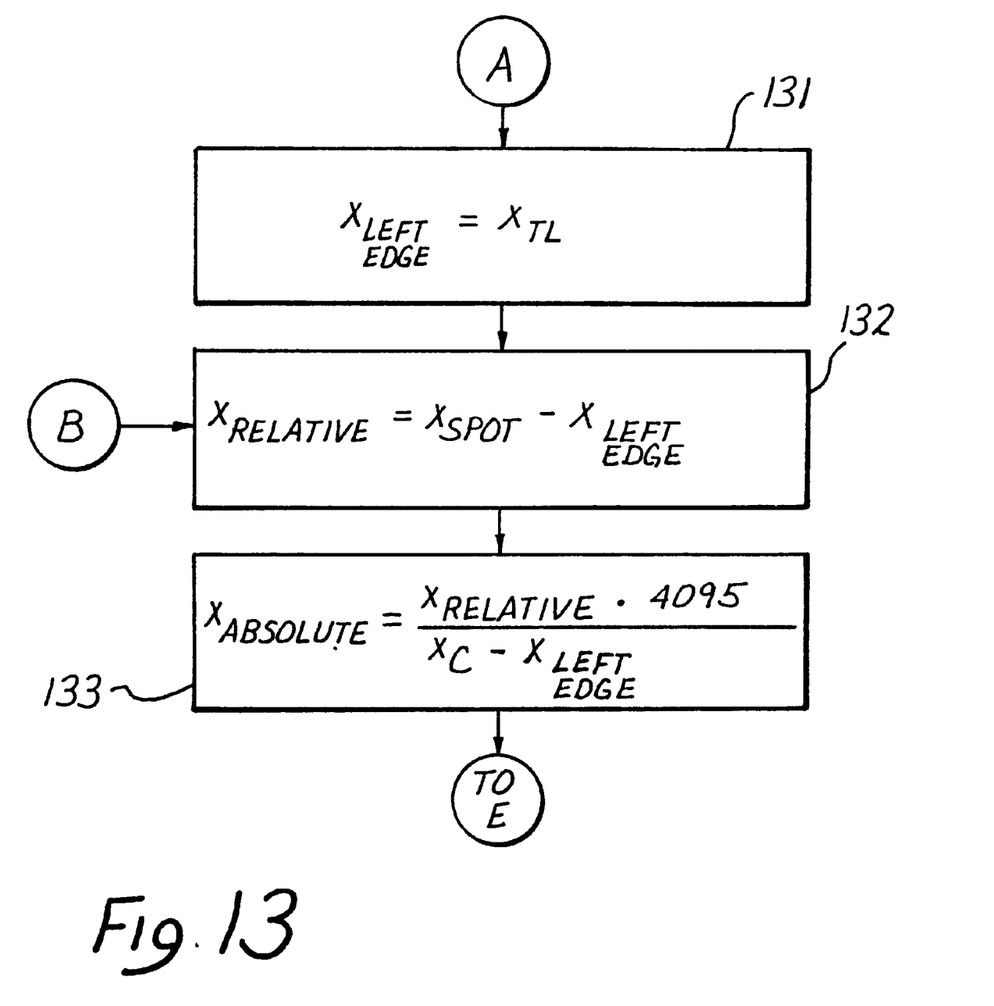

As indicated in box 122 in FIG. 12, and as shown in FIG. 3, the geometric center of the screen is determined and defined at the intersection of diagonal lines extending through the corners. And thereafter, as indicated in box 123, particular coordinates of a spot of light projected onto the screen by the handheld light device 24 is determined. In this regard, a position X of the spot of light is determined to be either left of center or not. If it is determined to be left of center, then the software will analyze whether the left edge is in perfect vertical alignment or whether it is distorted according to either one or the other triangular areas of distortion 81 or 82, as indicated more clearly in FIGS. 4 and 5. As indicated in box 124, a determination is made as to whether or not the left edge is a perfectly aligned vertical edge. In this regard, the X coordinate of the top, left corner is compared with the X coordinate bottom, left corner. If they are equal, then the edge is determined to be perfectly oriented in a vertical disposition, and thus correction is not required. If such occurs, box 131 of FIG. 13 is entered.

Assuming that a left margin of the image is required to be corrected, the decision box 125 is entered as shown in FIG. 12 to determine whether the X coordinate of the top left corner is greater than the bottom left corner. This determination is made to learn whether there is rectangular distortion area 81 (FIG. 4), or a triangular area of distortion shown at 82 of FIG. 5. The triangular area 81 is in the shape of a right triangle having its based aligned with the bottom edge of the rectangular image. The rectangular area 82 is inverted from the area 81, and has its base coextensive with the top edge of the rectangular image area.

At the decision box 125, if the X coordinate at the top left corner is greater than the X coordinate at the bottom left corner then it is determined that a triangular image area 82 is present. In such a situation, the box 126 is entered and the left edge X coordinate is calculated in the box 126. Thereafter, at the boxes 132, 133 the absolute value of the X coordinate of the spot is calculated. This value of the X coordinate is then used for sending to the computer 16, instead of sending of the value of the X coordinate of the spot of light as detected by the sensor 14. In this regard, the formula shown in the boxes 132 and 133 are used to scale the X coordinate of the spot of light on the screen 21 to correct geometrically for any distortions. It should be understood that this X coordinate correction is calculated on the slide for each spot of light detected by the image sensor 14.

Thus, it is to be understood that the initial storing of the X and Y coordinates of the four corners and the defined center is the only information that need be saved during initialization process. Thereafter, the absolute values of the X and Y coordinates of the spot of light are calculated and supplied to the host computer 16 on the fly.

Figure 4:
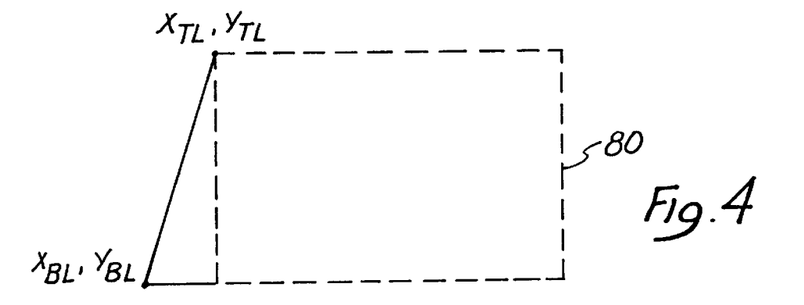

In order to determine the other left edge triangular area of distortion indicated at 81 at FIGS. 2 and 4, the decision box 125 of FIG. 12 will determine that the top left X coordinate is not greater than the bottom left X coordinate, so that the box 126 is entered to calculate the left edge X coordinate. After so calculating, the boxes 132 and 133 are entered to determine a different X ABSOLUTE value based upon the triangular area 81 of distortion.

Figure 14:
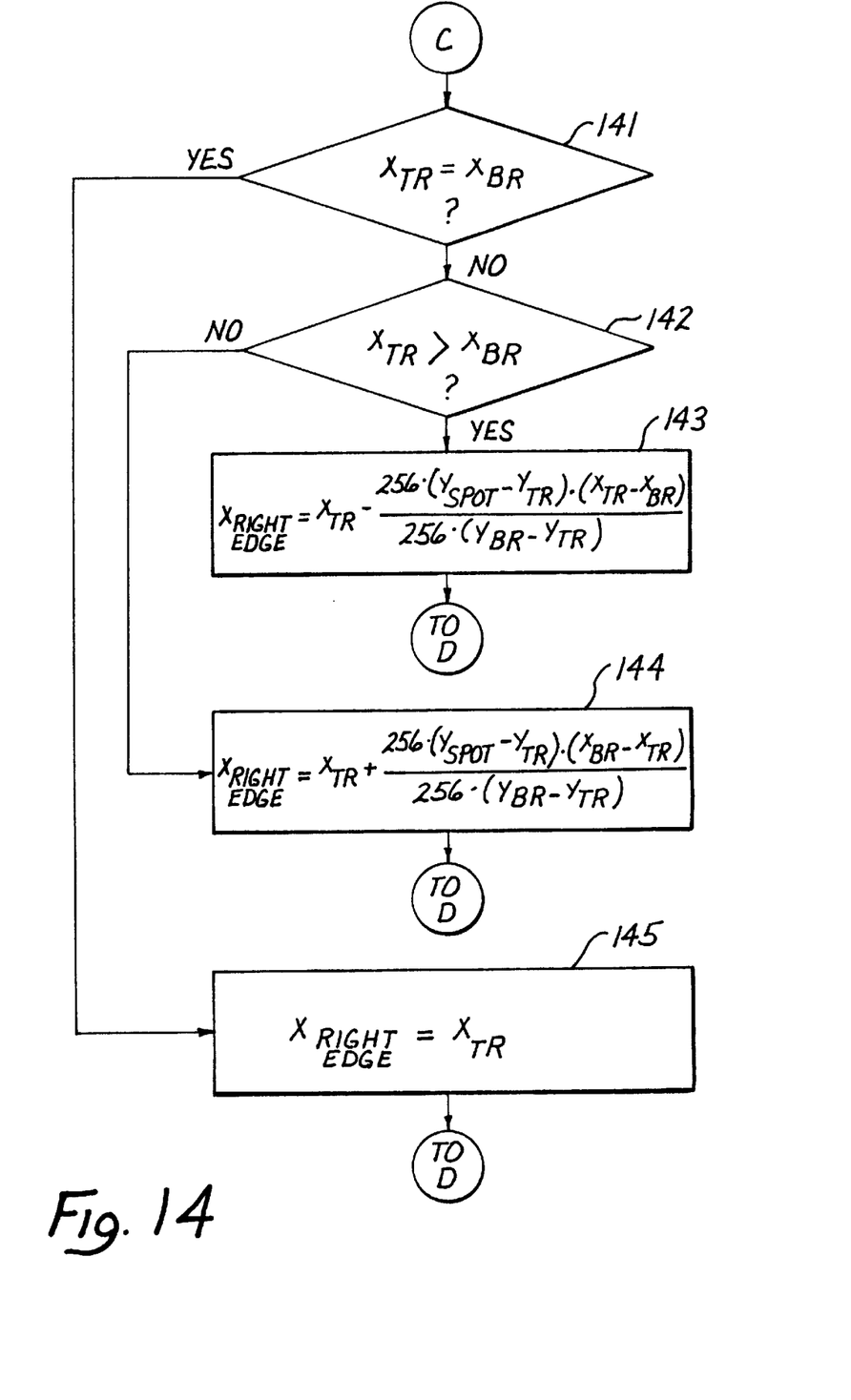

Referring again to box 123 to where the X coordinate position of the light spot is determined to be left of center, if it is not left of center then the decision box 141 of FIG. 14 is entered. A determination will then be made as to whether the right edge of the rectangular image area is perfectly vertical, or whether one of the two triangular areas 83 and 84 at the right edge of the image area occurs. This operation is similar to the operation of distinguishing the top triangular areas 81 and 82.

At the decision box 141, there is determination made as to whether the top right X coordinate is equal to the bottom right X coordinate. If they are equal then box 145 is entered directly to determine if the right edge X coordinate is equal to the X coordinate of the top right edge.

However, if they are not equal, then the box 142 is entered to determine whether or not the top right X coordinate is greater than the bottom right X coordinate. If it is, then the right edge X coordinate is calculated by the formula shown in box 143. Thereafter, as indicated by box 151 and 152, the absolute value of the X coordinate is then calculated knowing the right edge X coordinate and the X coordinate of the light spot and the X coordinate of the defined center. This absolute value of X is then used and supplied to the host computer 16.

Referring again to the decision box 142, if the top right X coordinate is not greater than the bottom right X coordinate, then the triangular area 83 (FIG. 2) is identified and the box 144 is entered to calculate the X coordinate of the right edge, thereafter, calculations are made at boxes 151 and 152 calculating the absolute value of the X coordinate.

Once the absolute value of the X coordinate is determined from either one or the two triangular areas 83 or 84, absolute value of the Y coordinate is then calculated.

Figure 15:
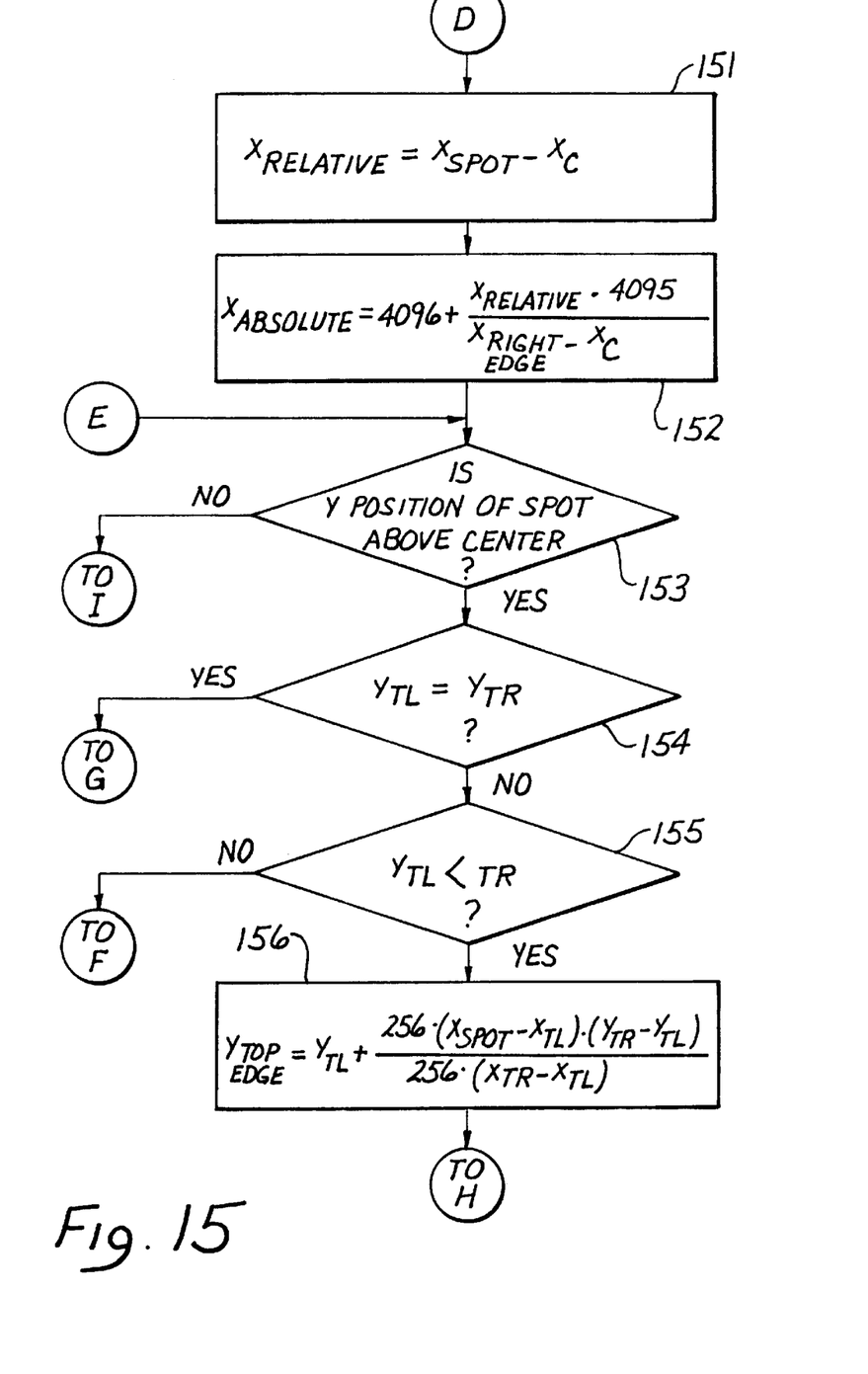

In order to calculate the relative value of the Y coordinate of the light spot, the quadrant of the light spot is first determined at box 153. In this regard, at box 153 a determination is made as to whether or not the Y position of the spot is above the defined center. If it is, then the decision box 154 is entered to determine whether the top edge is either horizontal or whether there are either one or two triangular areas 85 or 86 as shown in FIG. 2.

If a determination is made at box 154, if the top left Y coordinate is not equal to the right Y coordinate, then at the decision box 155, a determination is made as to whether or not the top left Y coordinate is less than the top right Y coordinate. This decision will identify which one of the two top triangular areas 85 or 86 is present. If the decision is positive, then the triangular area 86 is present. If the decision is positive, then the triangular area 86 is identified and the calculation shown in box 156 is made to determine the top edge Y coordinate. Thereafter, as shown in box 163 (FIG. 16A), and box 164 of FIG. 16A, the absolute value of Y is then determined for supplying it to the host computer 16. This value of the absolute value of Y is a scaled value of the Y coordinate of the spot.

Figure 16:
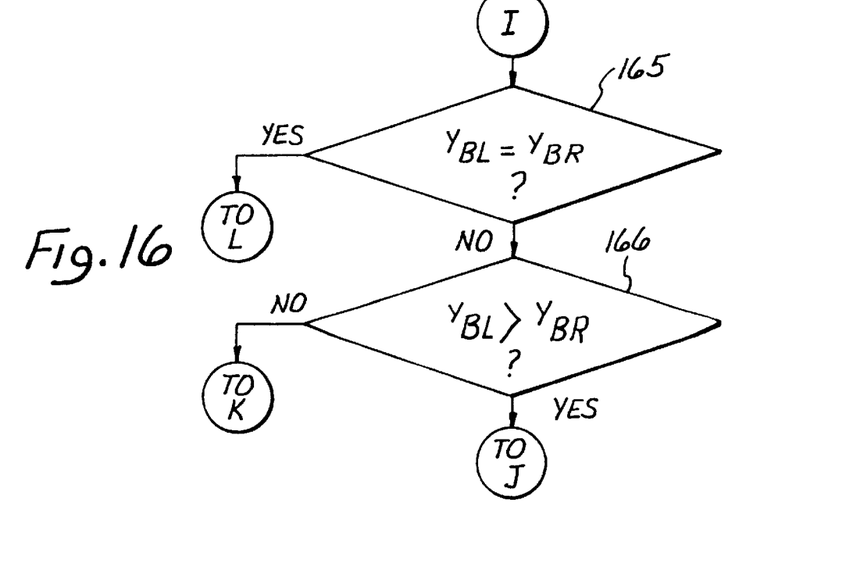
Figure 16A:
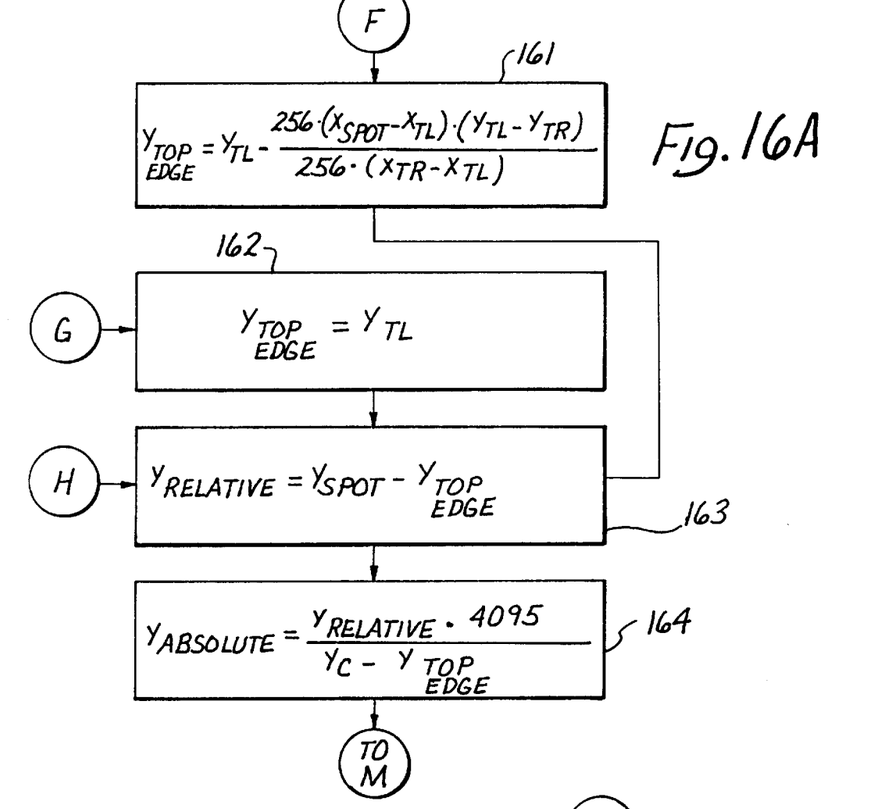

It the top triangular area 85 is present, a similar calculation is made at box 161 for the top edge of the Y coordinate of the triangular area 85. Thereafter, the absolute value of Y is then calculated boxes 163 and 164.

Figure 17:
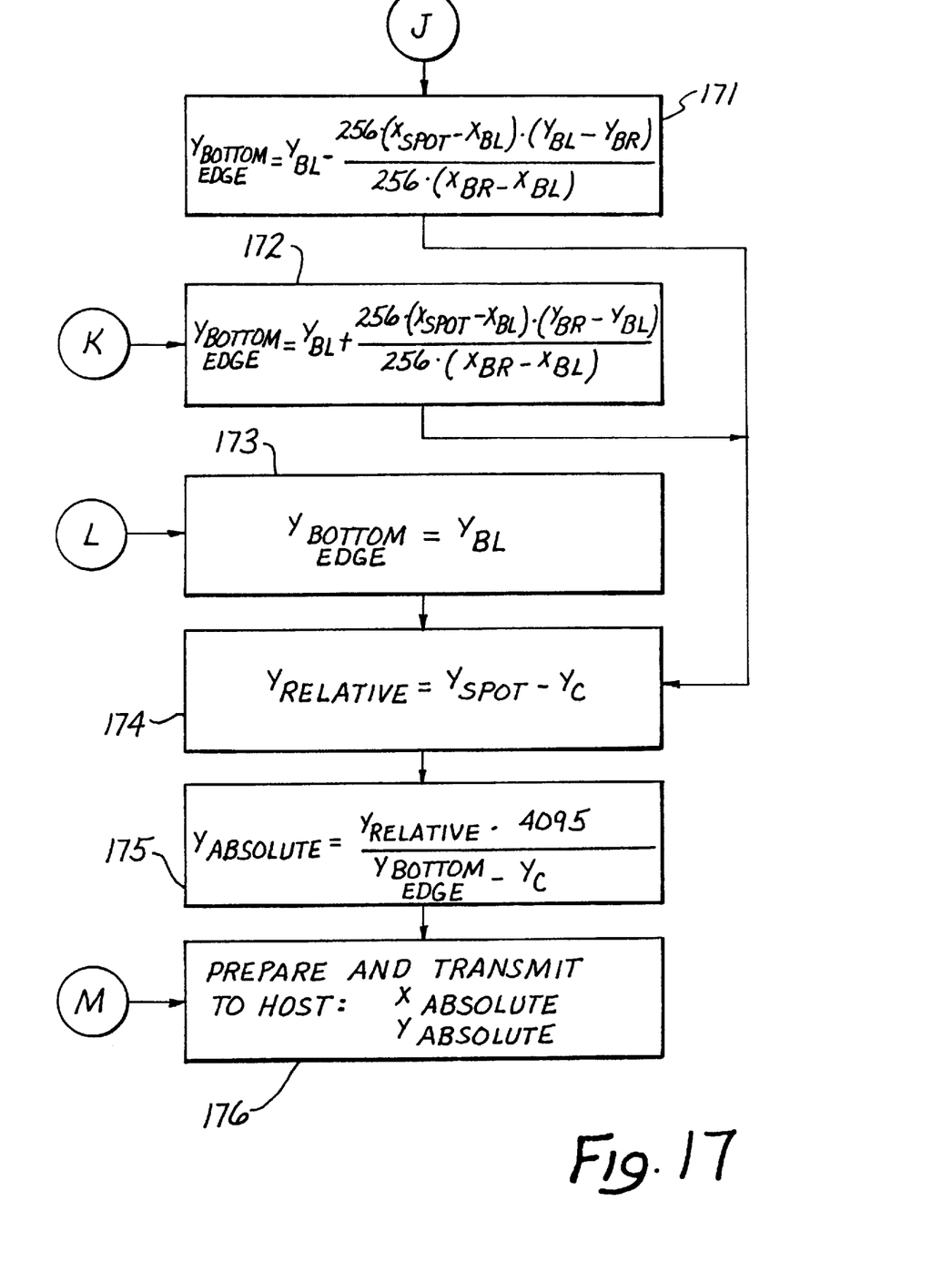

Once the absolute value of the Y coordinate is calculated, a box 176 in FIG. 17 is entered to prepare and transmit to the host computer once both absolute value of the X coordinate and the absolute value of the Y coordinates have been calculated. It should be noted that once these absolute values have been transmitted, the routine loops back to the initial box 123 to repeat the cycle of operation for the next light spot detected.

Referring again to box 153 of FIG. 15, if it is determined that the Y position of the spot is not above the center, then the decision box 165 of FIG. 16 is entered. A determination is then as to whether or not the bottom left Y coordinate is equal to the bottom right Y coordinate. The purpose of this determination is to decide whether the bottom edge of the rectangular viewing area is either horizontal, or at a triangular position as indicated at either 87 or 88 in FIG. 2. If it is determined that the bottom edge is a true horizontal line, then the boxes 173 through 175 are entered to calculate the value of the absolute value of Y as previously explained. On the other hand, if they are not equal, then the decision made in box 165 determines whether or not the bottom left Y coordinate is greater than the bottom right Y coordinate. If it is, then the box 171 is entered to perform a calculation to determine the bottom edge value of the Y coordinate. This calculation is based on the triangular area 88, since the bottom left Y coordinate is greater than the bottom right Y coordinate. If the reverse is true, then the calculation is made at box 172 based on the triangular area 87 to determine the bottom edge Y coordinate. Thereafter, the absolute value of the Y coordinate is calculated as previously described.

The following is a series of the equations used to perform the various calculations as illustrated in the flow charts to scale the X and Y coordinates of the light spot.

1) FIRST DETERMINE X, Y POSITIONS OF EACH 4 CORNERS
2) NEXT TO FIND CENTER OF SCREEN, FIND INTERSECTION OF DIAGONAL LINES:
REFERRING TO FIG. 3, CALCULATE:

$$\text{slope}_{m_{LR}} = \frac{Y_{TL} - Y_{BR}}{X_{TL} - X_{BR}} = \frac{Y_{BR} - Y_{TL}}{X_{BR} - X_{TL}} \qquad (1)$$

$$\text{slope}_{m_{RL}} = \frac{Y_{TR} - Y_{BL}}{X_{TR} - X_{BL}} = -\left(\frac{Y_{BL} - Y_{TR}}{X_{TR} - X_{BL}}\right) \qquad (2)$$

POINT SLOPE FORM OF EQUATION OF LINE $$y - Y_{BR} = m_{LR}(x - X_{BR}) \qquad (3)$$

$$y - Y_{BL} = m_{RL}(x - X_{BL}) \qquad (4)$$

$$y - Y_{BR} = m_{LR}x - m_{LR}X_{BL} \qquad (5)$$

$$y - Y_{BL} = m_{RL}x - m_{RL}X_{BL} \qquad (6)$$

$$y - m_{LR}x = Y_{BR} - m_{LR}X_{BR} \qquad (7)$$

$$y - m_{RL}x = Y_{BL} - m_{RL}X_{BL} \qquad (8)$$

$$\frac{-[y - m_{RL}x = Y_{BL} - m_{RL}X_{BL}]}{(m_{RL} - m_{LR})X_c = Y_{BR} - m_{LR}X_{BR} - Y_{BL} + m_{RL}X_{BL}} \quad (9)$$

$$X_c = \frac{Y_{BR} - m_{LR}X_{BR} - Y_{BL} + m_{RL}X_{BL}}{(m_{RL} - m_{LR})} \quad (10)$$

$$= \frac{m_{LR}X_{BR} + Y_{BL} + (-m_{RL})X_{BL} - Y_{BR}}{m_{LR} + (-m_{RL})}$$

$$= \frac{(256m_{LR})X_{BR} + 256Y_{BL} + (-256m_{RL})X_{BL} - 256Y_{BR}}{(256m_{LR}) + (-256m_{RL})} \quad (11)$$

SUBSTITUTING INTO FIRST EQUATION $$y_c = m_{LR}X_C - m_{LR}X_{BR} + Y_{BR} \quad (12)$$

$$Y_C = m_{LR}X_C - m_{LR}X_{BR} + Y_{BR} \quad (13)$$

3) DETERMINE IN WHICH QUADRANT, THE SPOT APPEARS BY APPLYING VERTICAL & HORIZONTAL CENTER LINES THROUGH THE CALCULATED CENTER.
4) COMPUTE THE ADJUSTED EDGE FOR BOTH X & Y IN THE FOUND QUANDRANT.

$$\text{TAN}\alpha = \frac{\text{SIDE OPP}}{\text{SIDE ADJ}} \quad (14)$$

SIDEOPP(ADJUSTMENT)=(DISTANCE)(TANα), WHERE DISTANCE EQUALS SIDE ADJ. (15)

REFERRING TO FIG. 4, FOR A LEFT EDGE OF $$X_{HOME} = X_{TL} - (Y_{RAW} - Y_{TL}) \cdot \left(\frac{X_{TL} - X_{BL}}{Y_{BL} - Y_{TL}}\right) \text{ where} \quad (16)$$

$$(Y_{RAW} - Y_{TL}) = \text{DISTANCE, AND WHERE}$$

$$\left(\frac{X_{TL} - X_{BL}}{Y_{BL} - Y_{TL}}\right) = \text{TAN}\alpha.$$

$X_{RELATIVE} = X_{RAW} - X_{HOME}$ NOTE: IF $X_{REL}$ IS NEGATIVE THEN POSITION IS OUTSIDE OF SCREEN. (17)

$$x_{ABSOLUTE} = \frac{X_{REL}(4095)}{X_C - X_{HOME}} \quad (18)$$

Figure 5:
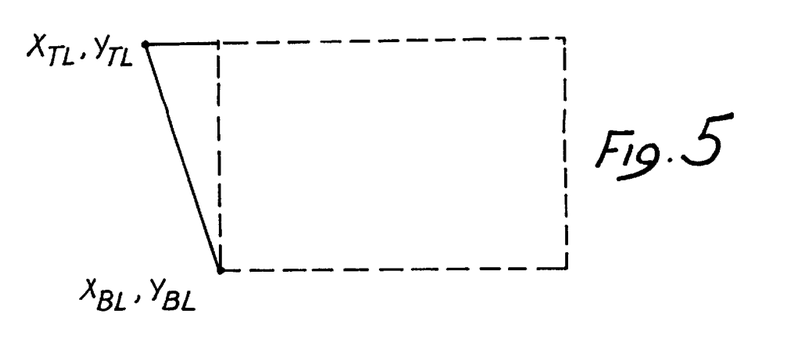

REFERRING TO FIG. 5, FOR A LEFT EDGE OF $$X_{HOME} = X_{TL} + (Y_{RAW} - Y_{TL}) \cdot \left(\frac{X_{BL} - X_{TL}}{Y_{BL} - Y_{TL}}\right) \quad (19)$$

$X_{REL} = X_{RAW} - X_{HOME}$ (NOTE: IF $X_{REL}$ IS NEGATIVE THEN POSITIVE IS OUTSIDE OF SCREEN (20)

$$X_{ABS} = \frac{X_{REL} \cdot 4095}{X_c - X_{HOME}} \quad (21)$$

Figure 6:
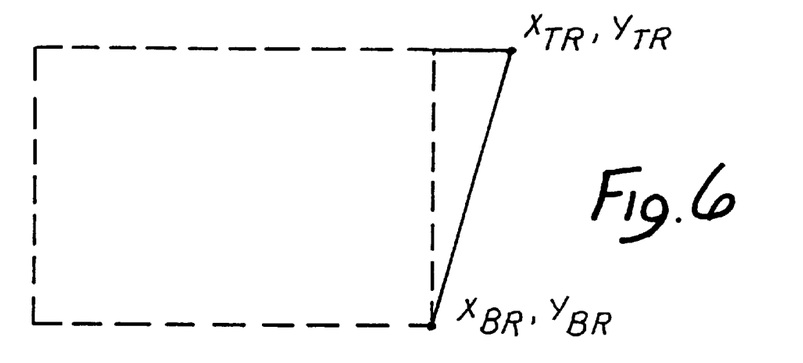

REFERRING TO FIG. 6, FOR THE RIGHT EDGE OF $$X_{RIGHT} = x_{TR} - (Y_{RAN} - Y_{TR}) \cdot \left(\frac{x_{TR} - Y_{BR}}{Y_{BR} - Y_{TR}}\right) \quad (22)$$

$X_{REL} = X_{RAW} - X_o$ (NOTE: IF $X_{RAN} > X_{RIGHT}$ THEN OUTSIDE OF SCREEN) (23)

$$X_{ABS} = 4096 + \frac{X_{REL} \cdot 4095}{X_{RIGHT} - X_c} \quad (24)$$

Figure 7:
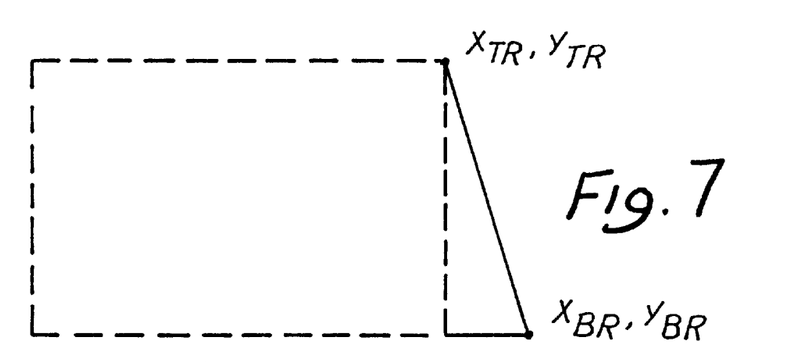

REFERRING TO FIG. 7, FOR A RIGHT EDGE OF $$X_{RIGHT} = X_{TR} + (Y_{RAW} - Y_{TR}) \cdot \left(\frac{X_{BR} - X_{TR}}{Y_{TR} - Y_{TR}}\right) \quad (25)$$

$X_{REL} = X_{RAW} - X_C$ (NOTE: IF $X_{RAW} > X_{RIGHT}$ THEN OUTSIDE OF SCREEN) (26)

$$X_{ABS} = 4096 + \frac{X_{REL} \cdot 4095}{X_{RIGHT} - X_c} \quad (27)$$

Figure 8:
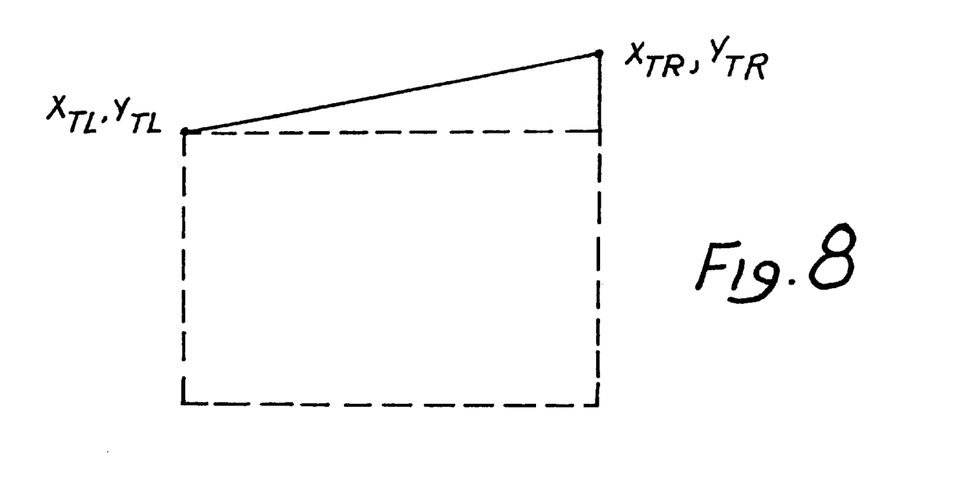

REFERRING TO FIG. 8, FOR A TOP EDGE OF $$Y_{HOME} = Y_{TL} - (X_{RAW} - X_{TL})\left(\frac{Y_{TL} - Y_{TR}}{X_{TR} - X_{TL}}\right) \quad (28)$$

$Y_{REL} = Y_{RAW} - Y_{HOME}$ NOTE: IF $Y_{RAW} < Y_{HOME}$ THEN OUTSIDE OF SCREEN) (29)

$$Y_{ABS} = \frac{Y_{REL} \cdot 4095}{Y_C - Y_{HOME}} \quad (30)$$

Figure 9:
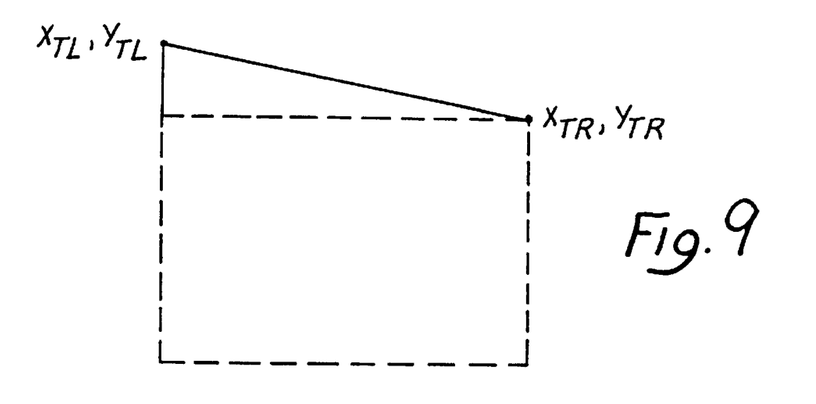

REFERRING TO FIG. 9, FOR A TOP EDGE OF $$Y_{HOME} = Y_{TL} + (X_{RAW} - X_{TL})\left(\frac{Y_{TR} - Y_{TL}}{X_{TR} - X_{TL}}\right) \quad (31)$$

$Y_{REL} = Y_{RAW} - Y_{HOME}$ ((NOTE: IF $Y_{RAW} < Y_{HOME}$ THEN OUTSIDE OF SCREEN) (32)

$$Y_{ABS} = \frac{Y_{REL} \cdot 4095}{Y_c - Y_{HOME}} \quad (33)$$

Figure 10:
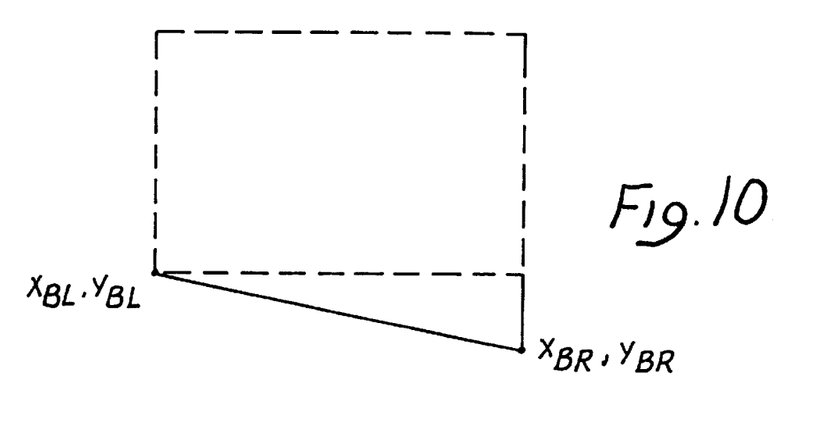

REFERRING TO FIG. 10, FOR A BOTTOM EDGE OF $$Y_{BOTTOM} = Y_{BL} - (X_{RAW} - X_{BL})\left(\frac{Y_{BL} - Y_{BR}}{X_{BR} - X_{BL}}\right) \quad (34)$$

$Y_{REL} = Y_{RAW} - Y_C$ (NOTE: IF $Y_{RAW} > Y_{BOTTOM}$ THEN OUTSIDE OF SCREEN) (35)

$$Y_{ABS} = 4096 + \frac{Y_{REL} \cdot 4095}{Y_{BOTTOM} - Y_C} \quad (36)$$

Figure 11:
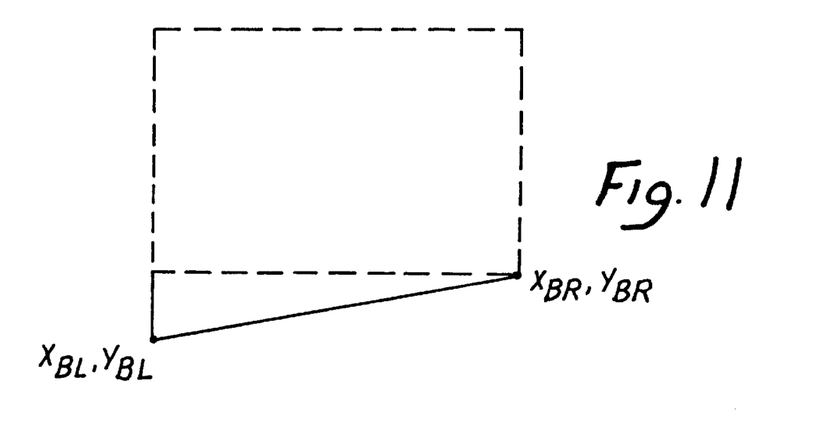

REFERRING TO FIG. 11, FOR A BOTTOM EDGE OF $$Y_{BOTTOM} = Y_{BL} + (X_{RAW} - X_{BL})\left(\frac{Y_{BR} - Y_{BL}}{X_{BR} - X_{BL}}\right) \quad (37)$$

$Y_{REL} = Y_{RAW} - Y_C$ (NOTE: IF $Y_{RAW} > Y_{BOTTOM}$ THEN OUTSIDE OF SCREEN) (38)

$$Y_{ABS} = 4096 + \frac{Y_{REL} \cdot 4095}{Y_{BOTTOM} - Y_C}. \quad (39)$$

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A coordinate correction apparatus comprising:

image detection means for perceiving visually a displayed generally rectangularly shaped projected image having keystone distortion;

hand held auxiliary light means for successively illuminating the corners of the distorted image with spots of high intensity auxiliary control light for facilitating defining the geometric form of the keystone distortion in the projected image;

said image detection means responsive to said spots of high intensity light only during a calibration mode for generating a signal indicative of the location of the high intensity spots;

signal processing means responsive to said signal during said calibration mode for determining the geometric center of the geometric form of the keystone distortion defined by the intersection coordinate values of a pair of imaginary lines interconnecting the detected spots of high intensity light;

distortion orientation calculating means responsive to the determined geometric center for determining quadrant scaling factors to facilitate determining corrected coordinate values for detected spots of high intensity auxiliary control light during a normal mode of operation;

said signal processing means storing the scaling factors for use during said normal mode of operation to enable said signal processing means to convert subsequently a determined auxiliary light sensing coordinate value relative to another computer generated projected image having substantially the same keystone distortion as said first mentioned projected image;

said signal processing means using said stored scaling factors for converting the determined auxiliary light sensory coordinate values to absolute coordinate values, said absolute coordinate values being indicative of corresponding coordinate value information defining a fixed location within said another computer generated image.

2. An apparatus according to claim 1, further comprising:
   means for determining the corner x,y coordinate values for each respective corner of the displayed image; and
   means for determining the x,y coordinate values for a defined center within the displayed image area, wherein said image area is bounded by the four respective edges of the displayed image.

3. An apparatus according to claim 2, wherein said means for determining the x,y coordinate value for said defined center includes point slope determining means.

4. An apparatus according to claim 3, wherein said point slope determining means includes algorithm means.

5. An apparatus according to claim 4, wherein said algorithm means includes means for solving an equation:

$$\text{slope } m_{lr} = \frac{y_{TL} - y_{BR}}{X_{TL} - X_{BR}} = \frac{y_{BR} - y_{TL}}{X_{BR} - X_{TL}}$$

wherein $y_{TL}$ is indicative of a determined Y top left coordinate value:

wherein $Y_{BR}$ is indicative of a determined y bottom right coordinate value;

wherein $X_{TL}$ is indicative of a determined X top left coordinate value; and wherein $X_{BR}$ is indicative of a determined Y bottom right coordinate value.

6. An apparatus according to claim 5, wherein said algorithm means includes means for solving a pair of equations:

$$X_c = \frac{y_{BR} - m_{LR}X_{BR} - y_{BL} + m_{RL}X_{BL}}{(m_{LR} - m_{LR})}; \text{ and}$$

$$y_c = m_{LR}X_c - m_{LR}X_{BR} + Y_{BR}.$$

7. An apparatus according to claim 1 further comprising:

means for determining the x,y coordinate locations of each respective corner of the displayed image; and means for determining a defined center coordinate location for the displayed image.

8. An apparatus according to claim 1, wherein said distortion orientation calculating means includes:

means for calculating an adjusted edge for both X and Y stored determined correction coordinate location values in the quadrant of the determined geometric center; and means for calculating an absolute x value and an absolute y value.

9. An apparatus according to claim 8, wherein said absolute y value is:

$$Y_{absolute} = \frac{4096 Y_{relative}}{Y_{bottom\ edge} - Y_c}$$

10. An apparatus according to claim 9, wherein said $Y_{relative}$ is:

$$Y_{relative} = Y_{SPOT} - Y_c.$$

11. An apparatus according to claim 10, wherein said $y_{spot}$ is indicative of the y coordinate value of the projected x,y coordinate image of light.

12. An apparatus according to claim 8, wherein said absolute x value is $$X_{absolute} = \frac{x_{relative} \cdot 4095}{x_c - x_{LEFT\ EDGE}}$$

13. An apparatus according to claim 12, wherein said $X_{RELATIVE}$ is:

$$X_{relative} = X_{SPOT} - X_{left\ edge}.$$

14. An apparatus according to claim 13, wherein said $x_{SPOT}$ is indicative of the x coordinate image of light.

15. An apparatus according to claim 14, wherein said X left edge is $X_{TL}$.

16. An apparatus according to claim 13, wherein said X left edge is $X_{TL}$.

17. An apparatus according to claim 1, further comprising:

said image detection means responsive to the projected image in another calibration mode for perceiving visually the distorted image and for generating a video signal indicative of the projected image;

said signal processing means further being responsive to said image detection means for determining image detection coordinate values for the distorted image, said distorted image having four determined corner coordinate values and associated right, left, top and bottom boundaries;

left boundary distortion determination means for calculating whether or not the left boundary is aligned vertically relative to its associated determined corner coordinate values;

right boundary distortion determination means for calculating whether or not the right boundary is aligned vertically relative to its associated determined coordinate values;

top boundary distortion determination means for calculating whether or not the top boundary is aligned horizontally relative to its associated determined corner coordinate values;

bottom boundary distortion determination means for calculating whether or not the bottom boundary is aligned horizontally relative to its associated determined corner coordinate values;

left distortion orientation means responsive to said left boundary distortion determination means for determining whether determined left boundary distortion is rectangular distortion or triangular distortion;

left triangular distortion correction means for calculating a set of corrected image detection coordinate values for the left edge of the distorted image;

left rectangular distortion correction means for calculating another set of corrected image detection coordinate values for the left edge of the distorted image;

absolute correction means responsive to said left triangular distortion correction means and said left rectangular distortion correction means for converting one set of the left edge corrected image detection coordinate values to absolute computer coordinate values;

right distortion orientation means responsive to said right boundary distortion determination means for determining whether determined right boundary distortion is rectangular distortion or triangular distortion;

right triangular distortion correction means for calculating a set of corrected image detection coordinate values for the right edge of the distorted image;

right rectangular distortion correction means for calculating another set of corrected image detection coordinate values for the right edge of the distorted image;

absolute correction means responsive to said right triangular distortion correction means and said right rectangular distortion correction means for converting one set of the right edge corrected image detection coordinate values to absolute computer coordinate values;

top distortion orientation means responsive to said top boundary distortion determination means for determining whether determined top boundary distortion is rectangular distortion or triangular distortion;

top triangular distortion correction means for calculating a set of corrected image detection coordinate values for the top edge of the distorted image;

top rectangular distortion correction means for calculating another set of corrected image detection coordinate values for the top edge of the distorted image;

absolute correction means responsive to said top triangular distortion correction means and said top rectangular distortion correction means for converting one set of the top edge corrected image detection coordinate values to absolute computer coordinate values;

bottom distortion orientation means responsive to said bottom boundary distortion determination means for determining whether determined bottom boundary distortion is rectangular distortion or triangular distortion;

bottom triangular distortion correction means for calculating a set of corrected image detection coordinate values for the bottom edge of the distorted image;

bottom rectangular distortion correction means for calculating another set of corrected image detection coordinate values for the bottom edge of the distorted image;

absolute correction means responsive to said bottom triangular distortion correction means and said bottom rectangular distortion correction means for converting one set of the bottom edge corrected image detection coordinate values to absolute computer coordinate values; and whereby corrected coordinate values for the right, left, top and bottom boundaries are calculated to substantially eliminate errors in input coordinate information resulting from keystone image distortion in the projected image.

18. An apparatus for substantially eliminating errors in optical input information resulting from image distortion in a projected image, comprising means for determining image detection coordinate values for any detected substantially flat generally rectangularly shaped projected image having possible edge distortion, said distortion being a distortion caused by a height differential between the position of the projected image on a viewing surface relative to the position of image projection means producing the projected image;

said determined image detection coordinate values including four determined corner coordinate values;

boundary distortion determination means for calculating whether or not any boundary between a pair of adjacent determined corner coordinate values is aligned rectilinearly relative to its associated determined corner coordinate values;

distortion orientation means responsive to said boundary distortion determination means for determining the orientation of the distortion relative to an imaginary rectilinear line forming part of an imaginary rectilinearly shaped image;

distortion correction means for calculating a set of corrected image detection coordinate values to eliminate errors in coordinate information resulting from edge distortion in the projected image; and absolute correction means responsive to said distortion correction means for converting said set of corrected image detection coordinate values to absolute coordinate values, said absolute coordinate values being indicative of corresponding coordinate value information generated by said image projection means.

* * * * *